United States Patent [19]

Ballu

[11] Patent Number: 4,465,233

[45] Date of Patent: Aug. 14, 1984

[54] SPRAYING DEVICE, PARTICULARLY FOR TREATMENT OF PLANTS

[75] Inventor: Patrick J. Ballu, Reims, France

[73] Assignee: Tecnoma, Epernay, France

[21] Appl. No.: 389,951

[22] Filed: Jun. 18, 1982

[30] Foreign Application Priority Data

Jun. 26, 1981 [FR] France ............................ 81 12624

[51] Int. Cl.³ .............................................. B05B 9/06
[52] U.S. Cl. ...................................... 239/77; 239/264
[58] Field of Search .......................... 239/77, 225, 264

[56] References Cited

U.S. PATENT DOCUMENTS

| | | | |
|---|---|---|---|
| 2,238,120 | 4/1941 | Laurder | 239/77 |
| 2,374,955 | 5/1945 | Raper | 239/77 |
| 2,613,109 | 10/1952 | Walker | 239/77 |
| 3,883,073 | 5/1975 | Ballu | 239/77 |

FOREIGN PATENT DOCUMENTS

| | | |
|---|---|---|
| 1314453 | 12/1962 | France . |
| 1562185 | 4/1969 | France . |
| 2192466 | 7/1972 | France . |
| 2474345 | 1/1980 | France . |
| 713312 | 8/1954 | United Kingdom . |

Primary Examiner—John J. Love
Assistant Examiner—Mary F. McCarthy
Attorney, Agent, or Firm—Watson, Cole, Grindle & Watson

[57] ABSTRACT

Spraying device for treatment of plants comprising an extension of the shaft of the fan mounted in a spraying cannon coupled, by use of a belt, to a lower drive shaft, of fixed direction. A pivot spindle allows the cannon to be pivoted with respect to the fixed support.

7 Claims, 5 Drawing Figures

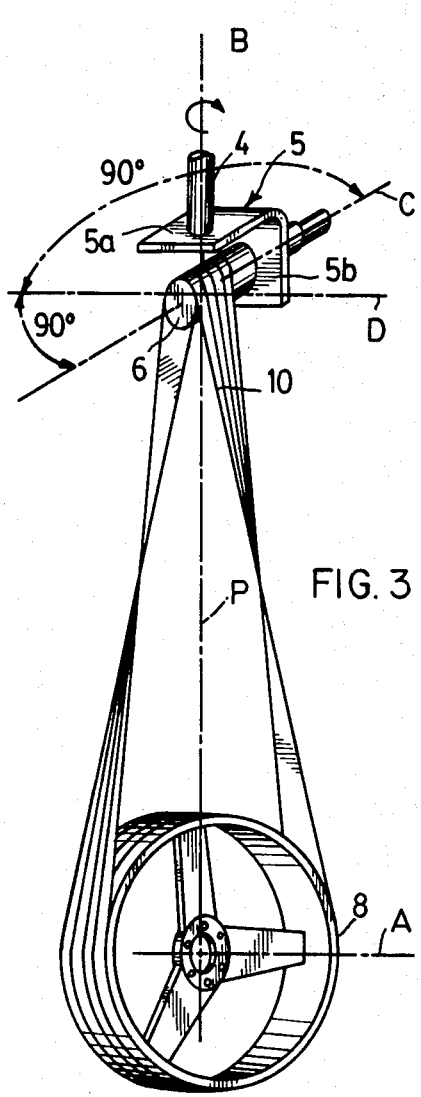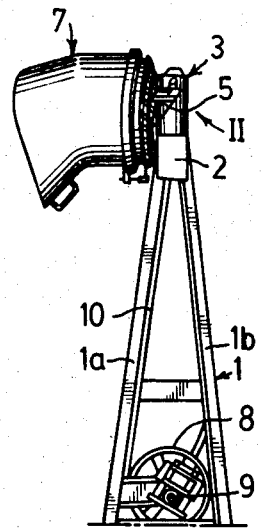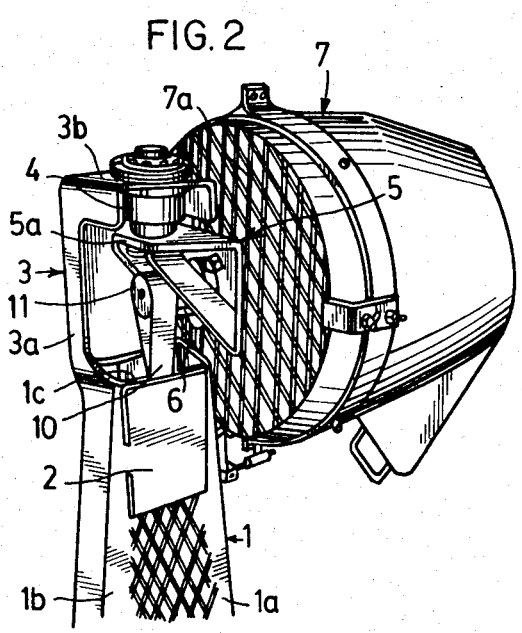

SPRAYING DEVICE, PARTICULARLY FOR TREATMENT OF PLANTS

The present invention relates to a spraying device, which can be carried or drawn by a tractor, in particular for the treatment of plants.

Spraying devices of this type are already known as each including a drive shaft of fixed direction, a transmission system for communicating movement of the shaft to a blower or a rotary fan, carried by a support at a certain distance from the drive shaft, as well as means which allow, in a plane substantially parallel to the drive shaft, the orientation of the whole assembly comprising the fan and the atomizing bodies to be varied with respect to the fixed direction of the drive shaft.

Spraying devices of this known type are equipped with transmission systems employing bevel gear wheels, which are heavy and expensive.

The present invention has the aim of improving spraying devices of the type stated above, in such a way that their weight and cost are reduced to an appreciable extent.

The spraying device in accordance with the invention is characterised in that its transmission system essentially includes a flexible belt coupling the drive shaft, of fixed direction, to an extension of the shaft of the fan, and that the whole assembly comprising the fan and the atomizing bodies is pivotally mounted on the corresponding end of the support, using a spindle which is arranged in the region of the perpendicular common axis of the drive shaft and the extension of the shaft of the fan on the other side to the belt with respect to the extension. The transmission system employing a belt with which the spraying device in accordance with the present invention is fitted, is particularly simple, light in weight and relatively inexpensive, its reliability not however being less than that of a transmission system using gear wheels.

These advantages of the spraying device in accordance with the present invention are however particularly used to advantage in one particular embodiment of this spraying device, which further includes known means for communicating a continuous pivoting movement, preferably at an adjustable speed, to the whole assembly comprising the fan and the spraying bodies, with respect to the fixed direction of the drive shaft, for example an oscillatory movement, the amplitude of which is preferably adjustable. In this embodiment, in fact, it is not necessary to provide, as in the prior art, a hollow column which was freely mounted so as to be able to turn about the shaft joining the two countershafts of the transmission system using bevel gear wheels; it is in fact adequate, for example, when this pivoting movement is directly communicated to the pivot spindle mounted on the corresponding end of the support, the latter remaining fixed in position with respect to the direction of the drive shaft. Very significant simplification and reduction in the cost of the spraying device in accordance with the present invention are achieved.

By way of example, one embodiment of the spraying device according to the present invention has been described below and diagrammatically illustrated in the attached drawing.

FIG. 1 is a partial view in elevation.

FIG. 2 is a partial view in perspective in the direction of arrow II in FIG. 1.

FIG. 3 is a diagrammatical view in perspective of the belt transmission system with which the spraying device in FIGS. 1 and 2 is equipped.

Figure 4:
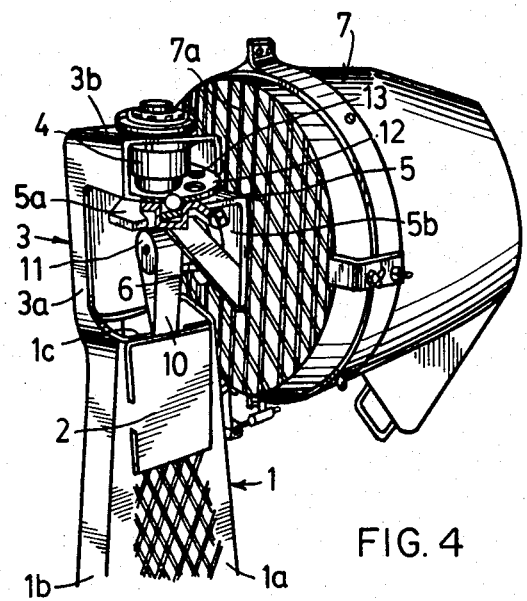
FIGS. 4 and 5 are views similar to FIG. 2 of other embodiments according to the invention.

In the various drawing Figures, the reference numeral 1 identifies a substantially vertical support, which, in the example illustrated, essentially comprises two girders 1a and 1b, joined together at their upper ends by plates similar to gussets, such as 2. The lower ends, which are not shown, of the girders 1a and 1b of the support 1 are associated with known structural components, which have also not been shown, but which make it possible to mount this support either behind a tractor, in a manner known per se, or on an independent chassis fitted with wheels or runners and designed to be coupled for example, to a tractor.

From the upper end of support 1, a piece in the shape of an angle-bracket 3, extends upwardly and includes a vertical part 3a and a horizontal part 3b extending above the upper end of the support 1. In this horizontal part 3b, a substantially vertical spindle 4 is mounted so as to be able to freely pivot, for example by means of a ball bearing arrangement. As can be seen in FIG. 2, this spindle 4 extends downwardly over a short distance below the horizontal part 3b and it carries a horizontal arm 5a of a right-angled piece 5, the other arm 5b of which extends approximately vertically in the space between, firstly, the upper end of support 1 and, secondly the horizontal arm 5a; a stub shaft 6 is mounted so as to be freely rotatable, notably via a ball bearing arrangement in the arm 5b of the right-angled piece 5, so as to extend above the open end 1c of the support 1, as can be seen in FIG. 2. At the other side to that of the arm 5b of the right-angled piece 5, the stub shaft 6 is coupled, using any suitable means, for example a rigid coupling, to the shaft (not shown) of a fan, the stub shaft 6 constituting an extension of the latter; the actual fan cannot be seen in FIGS. 1 and 2, since it is housed within a spraying cannon 7, of a known type, such as that, for example, described in French Patent Application No. 80.01759 filed by the present Applicant on Jan. 28, 1980, entitled "Spraying device with displacing jet".

In this cannon 7, of which, in FIG. 2, only the air intake grid 7a can be seen, not only is the fan referred to above housed, but also the spraying body, notably the atomizing nozzles. At the lower end of support 1, a pulley 8 for a belt is fitted between the two girders 1a and 1b, on a drive shaft 9 which is supported by bearings so as to exhibit a fixed direction with respect to the support 1; in the example illustrated the shaft 9 is, in particular, perpendicular to the plane of the two girders 1a and 1b, and substantially horizontal. This drive shaft can be coupled, using known means, which have not been shown, and which it is not necessary to describe in detail, to a source of motive power, for example with the power take-off of the tractor by means of which the spraying device described is carried or drawn along. In accordance with the present invention, a flexible belt 10 couples the pulley 8, fitted on the drive shaft 9, to a pulley having an appreciably smaller diameter, 11, which is fitted on the stub shaft 6, or which optionally can be constituted by the actual stub shaft 6, as can be seen at the upper portion of FIG. 3. The pulleys 8 and 11 are preferably provided with V-shaped grooves which in particular makes it possible to employ multiple belts 10, as illustrated in FIG. 3.

The operation of the aforedescribed spraying device in accordance with the present invention is: the assembly comprising the vertical spindle 4, the right-angled piece 5, and the cannon 7 which in particular encloses the fan and the atomizing bodies, is able to pivot, using the vertical spindle 4, so as to be able to adopt, with respect to the fixed direction of the drive shaft 9, or with respect to the fixed support 1, any orientation whatsoever between two extreme positions which are at 180° to each other, one of which can be seen in FIG. 2; these two extreme positions substantially correspond to the position where the right-angled piece 5 comes to bear against one of the two vertical sides of the vertical part 3a. Referring to FIG. 2, it will be readily understood that the jet of an atomized substance leaving the cannon 7 is able to sweep substantially half the horizontal plane situated at the side of the observer. FIG. 4 shows another embodiment of the invention, which is provided with known means for immobilizing the assembly 4-5-7 at different orientations, and in particular at the extreme positions which have been defined above. These locking means, include a horizontal sector 12 provided with a semi-circular row of perforations 13, this sector 12 being, rigidly fixed to the upper end of the piece 3 and cooperating with a releasable detent 14, such as, a spring-loaded ball, which is rigidly fixed to the horizontal arm 5a of the right-angled piece 5.

Figure 5:
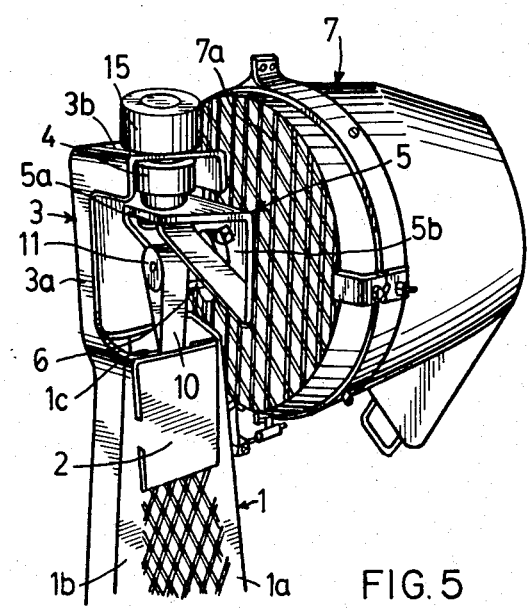

FIG. 5 shows still another embodiment of the invention in which a continuous pivoting movement alternating between the extreme positions described above is communicated to cannon 7 from an adjustable low speed motor 15, having its casing mounted on the part 3b of angle-bracket 3, and a driving shaft connected to the spindle 4. Clearly, the amplitude and speed, and consequently the frequency as well, of these alternating pivoting movements could be regulated, preferably in a continuous fashion, using known means which it is not necessary to describe in detail; these could, notably, consist of the means described in French Pat. No. 2,192,466. filed by the present application on July 7, 1972, entitled "Carried or drawn spraying device having an oscillating movement". The oscillatory pivoting movement could also be communicated using an appropriate system of linkages, to the right-angled piece 5, or even, optionally, directly to the end of cannon 7 which is closest to the right-angled piece.

In FIG. 3, A is the geometrical axis of the drive shaft (not shown), B that of the pivot spindle 4, C is the geometrical axis of the shaft of the fan (not shown), and of its extension comprising the stub shaft 6, and D is the projection of the geometrical axis A on the plane passing through C and parallel to A, in other words the plane defined by C and D. The fan is considered to be in the position where it is orientated in one of its extreme positions, where the axis C of its shaft is perpendicular to the axis A of the drive shaft; it will be clearly seen, starting from this extreme position, rotation of the right-angled piece 5 about the spindle 4 through an angle equal to 90° will bring the axis C of the fan parallel to the axis A of the drive shaft and a fresh rotation through 90° in the same sense will bring the axis C of the fan to its other extreme position, opposite to the first of these positions, and consequently also perpendicular pendicular to the axis A of the drive shaft. This shows clearly that the invention is not limited to the case where the drive shaft (9 in FIG. 1) is horizontal and the axis of pivot spindle 4 is vertical with the sweep of the spraying device taking place in a substantially horizontal plane; in fact, the drive shaft could possibly have a slight inclination with respect to the horizontal, but, in particular, the pivot spindle 4 may not be vertical but rather may have any desired inclination and could possibly even be horizontal, the plane in which the sweep of the spraying device occurs being in all these cases perpendicular to the pivot spindle 4 and parallel to the motor shaft 9. This results from the fact that in accordance with the invention, the pivot spindle 4 is arranged close to the perpendicular, P, which is common to the geometrical axis A of the motor shaft 9 and the geometrical axis C of the extension 6 of the shaft of the fan (in fact, in FIG. 3, B lies in the extension of P), said spindle 4 being obviously located on the other side to the belt 10 with respect to the extension 6.

In one embodiment, which is not shown, of the invention, the support 1 is pivotably mounted about the horizontal drive shaft 9 and known means, including jacks, make it possible to incline the support 1 and the pivot spindle 4 about the horizontal, and even to place them vertically with respect to the horizontal drive shaft in order, notably, to allow trees to be treated by spraying.

I claim:

1. Spraying device which can be carried or drawn by a tractor, in particular for the treatment of plants, having a drive shaft of fixed direction, a transmission system for communicating the movement of the shaft to a blower or a rotary fan, carried by a support, at a certain distance from the drive shaft, and means which allow, in a plane substantially parallel to the drive shaft, the orientation of the assembly comprising the fan and the atomizing bodies to be varied with respect to the fixed direction of the drive shaft, wherein the transmission system of the device essentially comprises a flexible belt coupling the drive shaft, of fixed direction, to an extension of the shaft of the fan, and that the whole assembly comprising the fan and atomizing bodies is pivotably mounted on the corresponding end of the support using a spindle which is arranged in the region of the perpendicular (P) common to the drive shaft and the extension of the shaft of the fan, on the other side to the belt with respect to said extension.

2. Device in accordance with claim 1, wherein the pivot spindle supports an arm of a right-angled bracket, in the other arm of which the extension of the shaft of the fan is mounted so as to be free to rotate.

3. Device in accordance with claim 1 or 2, wherein the transmission belt passes over two pulleys, optionally having V-grooves which are located respectively on the drive shaft and on the extension of the shaft of the fan.

4. Device in accordance with claim 1, 2 or 3, further including known means for immobilizing the assembly comprising the fan and the atomizing bodies at different orientations with respect to the fixed direction of the drive shaft.

5. Device in accordance with claim 1, 2 or 3, further including known means for communicating a continuous pivoting movement, preferably of adjustable speed, to the assembly comprising the fan and the atomizing bodies, with respect to the fixed direction of the drive shaft, for example an oscillatory movement preferably of controllable amplitude.

6. Device in accordance with claim 5, wherein the pivoting movement is communicated to the pivot spindle, or to the right-angled bracket which supports it, or directly to the assembly comprising the fan and the atomizing bodies.

7. Device in accordance with claim 1, 2 or 3, wherein the support is pivotably mounted about the substantially horizontal drive shaft.

* * * * *